H. REISERT.
WATER PURIFYING APPARATUS.
APPLICATION FILED MAR. 9, 1911.
1,009,857. Patented Nov. 28, 1911.
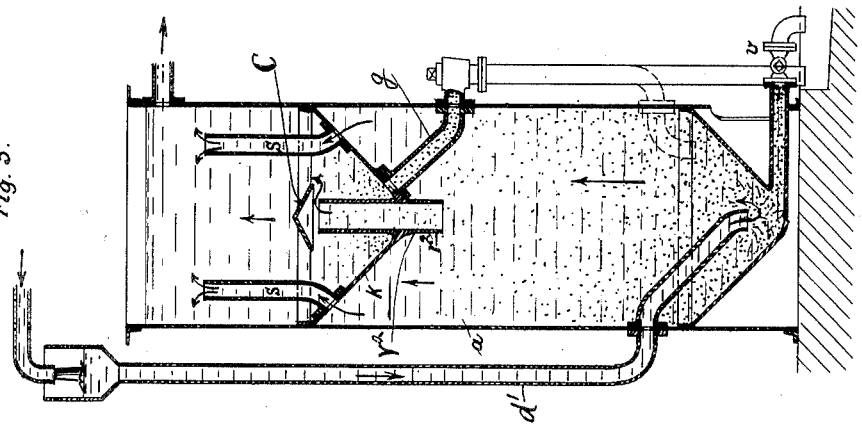
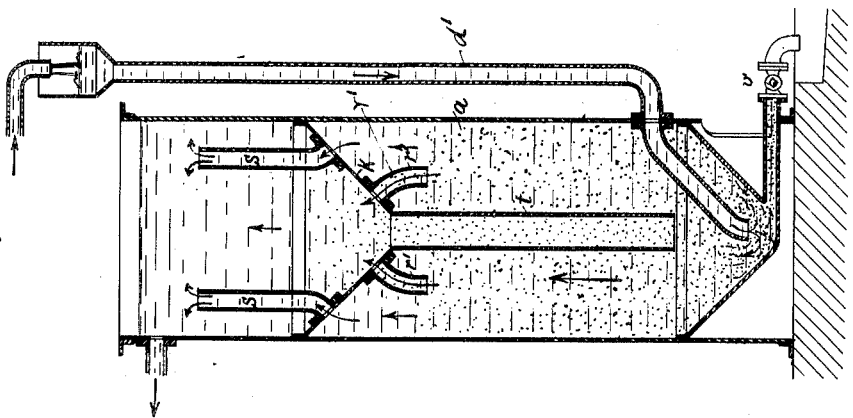
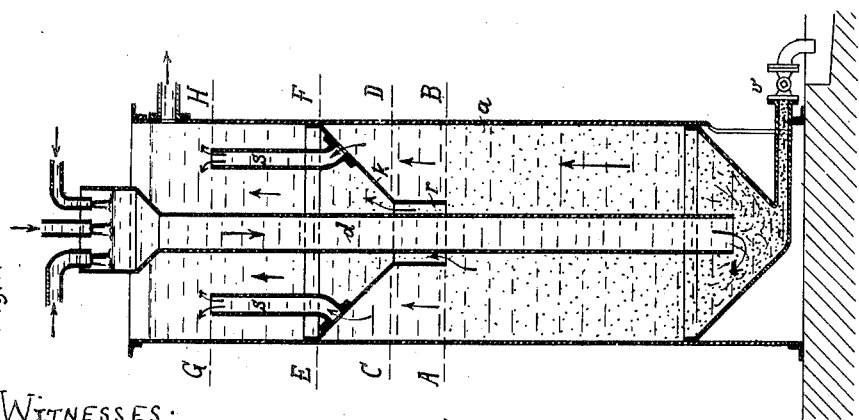

UNITED STATES PATENT OFFICE.

HANS REISERT, OF COLOGNE, GERMANY.

WATER-PURIFYING APPARATUS.

1,009,857.  Specification of Letters Patent.  Patented Nov. 28, 1911.

Application filed March 9, 1911. Serial No. 613,393.

*To all whom it may concern:*

Be it known that I, HANS REISERT, a subject of the Emperor of Germany, residing at Cologne, Prussia, Germany, have invented certain new and useful Improvements in Water-Purifying Apparatus, of which the following is a specification.

This invention relates to water-purifying apparatus, and more particularly to continuously operating reaction apparatus, for using such softening reagents, for example, as soda and calcium hydrate or barium carbonate and calcium hydrate. While in such apparatus the increase in the amount of sludge present may not decrease the activity of the reactions and may on the other hand promote the chemical action, it does have the disadvantage of rendering the clarifying of the softened water difficult or incomplete and causing the filter employed to clog too rapidly.

The object of this invention is to provide simple means for relieving the treated but dirty water of its burden of mechanical impurities, or a large portion thereof, so that the filtering operation can be performed successfully and without loading the filter with too much material.

The preferred form of the invention includes an inverted hollow cone in the reaction tank and uptakes of a particular relation located at the central and outer regions of the cone.

In the accompanying drawing Figures 1, 2 and 3 illustrate in vertical section three forms of this specific embodiment of the invention.

In Fig. 1, $a$ is the reaction tank, and $d$ is an intake for the mixture of raw water, lime water and soda solution, which intake pipe may descend centrally through the tank and preferably discharges downward close to the bottom so as to produce a swirl, in order to keep the sludge and deposit in motion and thus produce a better and quicker chemical reaction. Of course, the reagents may be introduced into the reaction tank in any other suitable way. The sludge may be drawn off from time to time from the bottom of the tank through a suitable pipe by means of a valve $v$. At a suitable height in the tank is disposed a hollow inverted cone $k$, which is provided with openings at its central and outer parts. From the central opening an uptake $r$ extends downward into the chamber below the cone for a suitable distance, and from the outer openings, preferably two in number, the uptakes $s, s$ extend well into the upper part of the chamber above the cone. The combined areas of the restricted exits from the lower chamber, afforded by the passages $r$ and $s\ s$ in this particular instance, are materially less than the cross-section of the tank, which of course is the cross-section of the upward flowing column of water. Preferably, though not necessarily, the area of the annular passage within the pipe $r$ is equal to the combined areas of the pipes $s, s$. Thus, it will be seen, conduits are provided leading from lower and higher levels in the lower chamber and discharging at lower and higher levels, respectively, in the upper chamber. The inlet ends of the pipes $s, s$, are shown materially above the inlet end of the pipe $r$, and the outlets of $s, s$ are materially above the outlet of $r$ and in the upper cylindrical part of the upper chamber. It follows that at the level of the lower end of pipe $r$, the upflowing column of sludge-burdened water in effect divides into two parts. One part flows upward through $r$, and spreads out into the chamber above the cone. The other stream continues upward below the cone and passes out from the lower chamber through the restricted exits $s, s$. The streams preferably reunite in the upper chamber at the level of the upper ends of the pipes $s\ s$. In this way two zones of velocity materially lower than the velocity of the column are afforded. Referring to the drawing for illustration, and assuming that half the water flows through $r$, and the other half through $s, s$, it follows that the velocity of the water in the zones between A—B and C—D, and between E—F and G—H is approximately half of the velocity of the column below A—B. Therefore, one-half of the water deposits or escapes from its burden at the lower zone above A—B, and the other part in the zone above the cone and below the upper ends of $s, s$. The material that is carried through the pipe $r$ over the cone drops back on the latter and by reason of the self-clearing inclination thereof slides back into the lower chamber. The water, in large measure freed from mechanical impurities, now flows from the upper chamber to the filter (not shown).

Fig. 2 shows similar apparatus more particularly designed for use with barium carbonate and calcium hydrate. In view of the great density of the barium sludge, the dividing cone $k$ is provided centrally with a discharge pipe $t$, which is broad and dips deep into the sludge at the bottom of the lower chamber and into which the water cannot rise by reason of the density and high specific gravity of this sludge. This pipe affords a discharge for deposit on the upper side of the cone separate and distinct from the uptakes for the water. Instead of the single pipe $r$, I here show two pipes $r'$, $r'$ affording the same cross-section as the annular passage in the pipe $r$ and located at the central part of the cone at opposite sides of the pipe $t$. The discharge ends of the pipes $r'$, $r'$ are somewhat higher than the upper end of the discharge $t$. In this form of apparatus the intake pipe $d'$ may be located mainly outside of the tank.

Fig. 3 shows how the sludge may be removed from the cone through a pipe $g$, and either delivered outside the apparatus or returned into the lower chamber. Here the intake pipe $r^2$, corresponding in function to $r$ of Fig. 1 and $r'$, $r'$ of Fig. 2, is shown as extending upward somewhat above the cone and being provided with a deflector cap $c$. In this way the pipes $r^2$ and $g$ are rendered even more distinct in function, since it will be practically impossible for any of the material to return through $r^2$. However, the upper end of the pipe $r^2$ is materially lower than the upper ends of the pipes $s$, $s$. The pipe $r^2$ may be extended downward into the lower chamber for varying distances, according to the particular conditions for which the tank is designed. It may extend considerably lower than is shown in the drawing, if desired.

In Figs. 2 and 3 the reagents may be prepared and introduced into the reaction chamber in any suitable way.

Numerous other embodiments of the invention are possible, and many changes in forms, proportions, sizes, details, arrangements, functions and operation may be made without departing from the invention.

What is claimed as new is:

1. Settling apparatus comprising a chamber and means for causing the water to flow upward therein, and exits leading from the chamber, part thereof at a relatively lower level and centrally of the chamber and part at a relatively higher level and at the outer parts of the chamber, said exits having a combined cross-section materially less than the chamber, whereby a zone of materially lowered velocity is afforded in the said chamber between the levels of the exits, and an upper settling chamber into the central part of which the lower exits open.

2. Settling apparatus comprising a chamber and means for causing the water to flow upward therein, and exits leading from the chamber, part thereof at a relatively lower level and centrally of the chamber and part at a relatively higher level and at the outer parts of the chamber, said exits having a combined cross-section materially less than the chamber, whereby a zone of materially lowered velocity is afforded in the said chamber between the levels of the exits, and an upper settling chamber into the central part of which the lower exits open, the bottom of said upper settling chamber having a self-clearing inclination.

3. Settling apparatus comprising a chamber and means for causing the water to flow upward therein, and exits leading from the chamber, part thereof at a relatively lower level and centrally of the chamber and part at a relatively higher level and at the outer parts of the chamber, said exits having a combined cross-section materially less than the chamber, whereby a zone of materially lowered velocity is afforded in the said chamber between the levels of the exits, and an upper settling chamber into the central part of which the lower exits open, the bottom of said upper settling chamber having a self-clearing inclination, and means for conducting deposit from the lowest part of the upper settling chamber.

4. Water-purifying apparatus, comprising two chambers one above the other and means for causing the water to flow upward therein, and uptakes connecting the chambers and of a combined cross-section materially less than the cross-section of the lower chamber, said uptakes being arranged in sets leading from the lower chamber at lower and higher levels and discharging into the upper chamber at lower and higher levels respectively, whereby settling zones are formed in the lower chamber between the levels of the inlets of the uptakes and in the upper chamber between the levels of the outlets of the uptakes.

5. Water-purifying apparatus, comprising two chambers one above the other and means for causing the water to flow upward therein, and uptakes connecting the chambers and of a combined cross-section materially less than the cross-section of the lower chamber, said uptakes being arranged in sets leading from the lower chamber at lower and higher levels and discharging into the upper chamber at lower and higher levels respectively, whereby settling zones are formed in the lower chamber between the levels of the inlets of the uptakes and in the upper chamber between the levels of the outlets of the uptakes, the upper chamber having a bottom with a self-clearing inclination.

6. Improved water-purifying apparatus having means whereby the water flows upward therein and including a reaction tank having an inverted hollow cone therein dividing the interior of the tank into upper and lower chambers, and exits from the lower chamber of a combined area less than the cross-section of the tank and arranged in sets, one set leading from the lower chamber at a relatively higher level and at the outer part of the cone and the other at a relatively lower level through the central part of the cone, whereby a zone of materially lessened velocity is afforded below the cone, and the latter set communicating with a settling zone of materially lessened velocity peculiar to that set above the cone.

7. Improved water-purifying apparatus having means whereby the water flows upward therein and including a reaction tank having an inverted hollow cone pointing downward therein dividing the interior of the tank into upper and lower chambers, and exits from the lower chamber of a combined area less than the cross-section of the tank and arranged in sets, one set leading from the lower chamber at a relatively higher level and at the outer part of the cone and the other at a relatively lower level through the central part of the cone, whereby a zone of materially lessened velocity is afforded below the cone, and the latter set communicating with a settling zone of materially lessened velocity peculiar to that set above the cone, and a sludge discharge distinct from said exits leading from the low part of the upper chamber at the central part of the cone.

8. Improved water-purifying apparatus, comprising a reaction tank and means whereby the water flows upward therein, an inverted hollow cone dividing the interior of the tank into lower and upper chambers, and uptake communications of a combined cross-section less than the cross-section of the tank, said communications being divided between the central and outer regions of the cone and leading from the lower chamber at lower and higher levels into the upper chamber at lower and higher levels respectively, whereby zones of lowered velocity are afforded in the upper part of the lower chamber and in the lower part of the upper chamber.

9. Improved water-purifying apparatus, comprising a reaction tank and means whereby the water flows upward therein, an inverted hollow cone dividing the interior of the tank into lower and upper chambers, and having an opening or openings at its central portion for admitting water from the lower chamber into the lower part of the upper chamber, and an uptake or uptakes leading from the lower chamber at the outer part of the cone into the upper part of the upper chamber, whereby zones of lowered velocity are afforded in the upper part of the lower chamber and in the lower part of the upper chamber.

10. Improved water-purifying apparatus, comprising a reaction tank and means whereby the water flows upward therein, an inverted hollow cone dividing the interior of the tank into lower and upper chambers, and having an opening or openings at its central portion for admitting water from the lower chamber into the lower part of the upper chamber, and other openings through the outer part of the cone, and uptakes leading from these last openings into the upper part of the upper chamber, whereby zones of lowered velocity are afforded in the upper part of the lower chamber and in the lower part of the upper chamber.

11. Improved water-purifying apparatus, comprising a reaction tank and means whereby the water flows upward therein, an inverted hollow cone dividing the interior of the tank into lower and upper chambers, an uptake or uptakes extending downward from the central part of the cone for a distance into the lower chamber, and an uptake or uptakes extending upward from the outer part of the cone well into the upper part of the upper chamber materially above the discharge ends of the central uptake or uptakes.

12. Improved water-purifying apparatus, comprising a reaction tank and means whereby the water flows upward therein, an inverted hollow cone dividing the interior of the tank into lower and upper chambers, and uptake communications of a combined cross-section less than the cross-section of the tank, said communications being divided between the central and outer regions of the cone and leading from the lower chamber at lower and higher levels into the upper chamber at lower and higher levers respectively, and a sludge discharge distinct from said communications leading from the low part of the upper chamber at the central part of the cone.

13. Improved water-purifying apparatus, comprising a reaction tank and means whereby the water flows upward therein, an inverted hollow cone dividing the interior of the tank into lower and upper chambers, and uptake communications of a combined cross-section less than the cross-section of the tank, said communications being divided between the central and outer regions of the cone and leading from the lower chamber at lower and higher levels into the upper chamber at lower and higher levels respectively, and a sludge discharge distinct from said communications leading from the upper chamber at a lower level than the discharge of the central uptake communication.

14. Improved water-purifying apparatus, comprising a tank and means whereby the water flows upward therein, a hollow cone dividing the interior of the tank into lower and upper chambers, uptake communications between the chambers of a combined cross-section less than the cross-section of the tank, said communications comprising sets leading from lower and higher levels in the lower chamber to lower and higher levels respectively in the upper chamber, whereby zones of materially lowered velocity are produced in the two chambers, and a sediment discharge from the upper chamber distinct from said uptakes.

15. Improved water-purifying apparatus, comprising a tank and means whereby the water flows upward therein, an inverted hollow cone dividing the interior of the tank into lower and upper chambers, uptake communications between the chambers of a combined cross-section less than the cross-section of the tank, said communications comprising sets leading from lower and higher levels in the lower chamber to lower and higher levels respectively in the upper chamber, whereby zones of materially lowered velocity are produced in the two chambers, and a sediment discharge pipe leading down from the central low part of the cone outside of the tank.

16. Improved water-purifying apparatus, comprising a tank and means whereby the water flows upward therein, a hollow cone secured at its margin to the side walls of the tank and dividing the interior thereof into lower and upper chambers, and uptake communications between the chambers of a combined cross-section less than the cross-section of the tank, said communications comprising sets one of which leads through the central part of the cone and the other of which leads through the outer part of the cone, one set having its inlet and outlet ends materially higher than the inlet and outlet ends of the other set, whereby zones of materially lowered velocity are produced in the two chambers.

In testimony whereof, I have signed my name to this specification, in the presence of two subscribing witnesses.

HANS REISERT.

Witnesses:
 LOUIS VANDORY,
 GERTRUD BONA.